(12) United States Patent
Stobbe et al.

(10) Patent No.: US 7,808,384 B2
(45) Date of Patent: Oct. 5, 2010

(54) INFORMATION CARRIER ARRANGEMENT, WASHABLE TEXTILE GOODS AND ELECTRONIC EAR TAG FOR LIVING BEINGS

(75) Inventors: Anatoli Stobbe, Barsinghausen (DE); Werner Knop, Wennigsen (DE)

(73) Assignee: EYES OPEN Corporation, Carson City, NV (US)

( * ) Notice: Subject to any disclaimer, the term of this patent is extended or adjusted under 35 U.S.C. 154(b) by 595 days.

(21) Appl. No.: 11/486,839

(22) Filed: Jul. 14, 2006

(65) Prior Publication Data

US 2008/0012709 A1 Jan. 17, 2008

(51) Int. Cl.
*G08B 13/14* (2006.01)
(52) U.S. Cl. .................. 340/572.1; 340/572.4; 343/748
(58) Field of Classification Search .............. 340/572.1, 340/572.4; 343/748
See application file for complete search history.

(56) References Cited

U.S. PATENT DOCUMENTS

| | | | |
|---|---|---|---|
| 3,902,118 A * | 8/1975 | Ikrath et al. ................ | 455/100 |
| 4,041,394 A * | 8/1977 | Pate .......................... | 455/100 |
| 5,508,684 A * | 4/1996 | Becker ..................... | 340/572.5 |
| 6,421,013 B1 * | 7/2002 | Chung .................. | 343/700 MS |
| 6,424,315 B1 * | 7/2002 | Glenn et al. ............... | 343/895 |
| 6,600,420 B2 * | 7/2003 | Goff et al. ................ | 340/572.4 |
| 7,158,033 B2 * | 1/2007 | Forster ..................... | 340/572.1 |
| 7,170,415 B2 * | 1/2007 | Forster ..................... | 340/572.4 |
| 7,171,331 B2 * | 1/2007 | Vock et al. ................. | 702/160 |
| 7,183,994 B2 * | 2/2007 | Weigand ..................... | 343/795 |
| 7,247,214 B2 * | 7/2007 | Chamandy et al. .......... | 156/249 |
| 7,479,888 B2 * | 1/2009 | Jacober et al. ............. | 340/572.8 |
| 2001/0053675 A1 * | 12/2001 | Plettner ........................ | 455/91 |
| 2002/0175873 A1 * | 11/2002 | King et al. .................. | 343/767 |
| 2003/0160732 A1 * | 8/2003 | Van Heerden et al. ....... | 343/897 |
| 2004/0035526 A1 * | 2/2004 | Chamandy et al. .......... | 156/293 |
| 2004/0244865 A1 * | 12/2004 | Jung et al. .............. | 139/426 R |
| 2006/0027666 A1 * | 2/2006 | Glaser ......................... | 235/492 |
| 2006/0043198 A1 * | 3/2006 | Forster ...................... | 235/492 |
| 2006/0043199 A1 * | 3/2006 | Baba et al. .................. | 235/492 |
| 2006/0054710 A1 * | 3/2006 | Forster et al. ............... | 235/492 |
| 2006/0145864 A1 * | 7/2006 | Jacober et al. ........... | 340/572.8 |
| 2006/0158380 A1 * | 7/2006 | Son et al. ..................... | 343/748 |
| 2006/0187060 A1 * | 8/2006 | Colby ..................... | 340/572.8 |
| 2007/0159332 A1 * | 7/2007 | Koblasz .................... | 340/572.1 |
| 2007/0290928 A1 * | 12/2007 | Chang et al. .......... | 343/700 MS |
| 2008/0007457 A1 * | 1/2008 | Copeland et al. ...... | 343/700 MS |
| 2008/0018479 A1 * | 1/2008 | Hashimoto et al. ....... | 340/572.8 |
| 2008/0088460 A1 * | 4/2008 | Copeland .................. | 340/572.7 |
| 2008/0119135 A1 * | 5/2008 | Washiro ..................... | 455/41.1 |
| 2008/0136634 A1 * | 6/2008 | Porte et al. ............... | 340/572.1 |
| 2008/0186245 A1 * | 8/2008 | Hilgers ....................... | 343/803 |

* cited by examiner

*Primary Examiner*—Daniel Wu
*Assistant Examiner*—Bradley E Thompson
(74) *Attorney, Agent, or Firm*—Jeffrey L. Thompson; Thompson & Thompson, P.A.

(57) ABSTRACT

An information carrier arrangement for an item to be identified includes a detection plate connected to the item and an electric antenna associated with the item. An electronic chip or an electronic chip module is provided on the detection plate, and a coupling element is disposed on the detection plate and connected to the electronic chip or electronic chip module. The coupling element is inductively and/or capacitatively coupled to the electric antenna. The item to be identified can be a product, a living being, a label, a tag, a single package, a containerized package or a transport aid.

36 Claims, 7 Drawing Sheets

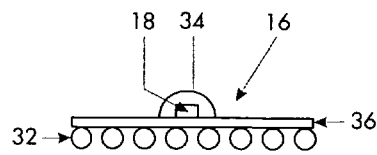
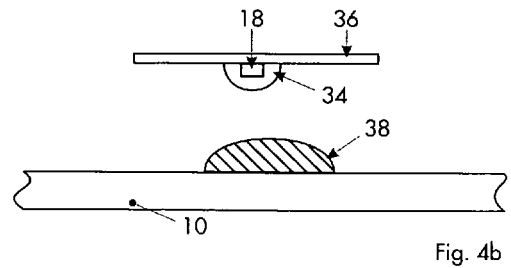
Fig. 4a
Fig. 4b
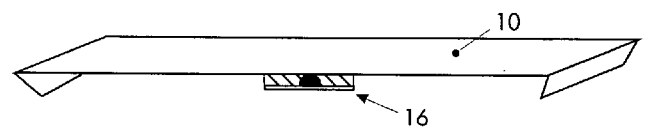
Fig. 5
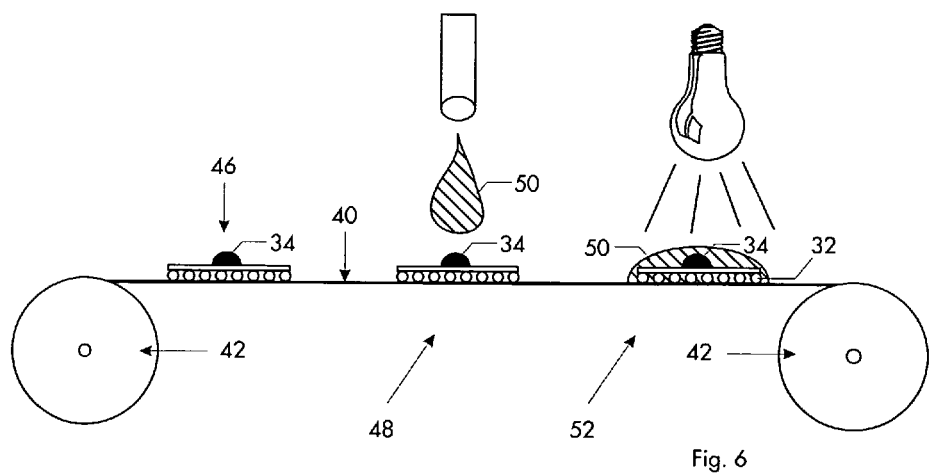
Fig. 6

INFORMATION CARRIER ARRANGEMENT, WASHABLE TEXTILE GOODS AND ELECTRONIC EAR TAG FOR LIVING BEINGS

FIELD OF THE INVENTION

The present invention relates generally to an information carrier arrangement, washable textile goods, and an electronic ear tag for living beings.

BACKGROUND OF THE INVENTION

Electromagnetically non-contact readable information carriers, so-called RFID transponders, comprising a chip or chip module and an antenna are known for the identification of goods or living beings, and can be disposed on a product, a living being, a label, a tag, a package, a container or a transport aid such as a pallet, bag or container. The identification of goods and living beings using electromagnetically non-contact readable information carriers facilitates the manufacture, processing, storage, monitoring, logistics, sale and protection against tampering with such products, pirating, or the incorrect identification of the origin in meat production. In contrast to directly or coded optically readable information carriers, electromagnetically non-contact readable information carriers are largely tamper-proof and non-sensitive to contamination and cleaning agents and are also readable without optical sight.

As a result of the miniaturized designs of electronic chips or chip modules for the HF, UHF and SHF ranges, these can be attached at suitable locations almost without impairing the use of the goods. However, the reading range of the information carrier is substantially dependent on the antenna connected to the electronic chip or chip module which must be matched to the working frequency and cannot be arbitrarily reduced in size without deterioration of the antenna gain. The connection or coupling or its reliability during the duration of usage between the antenna and the electronic chip or chip module can be a problem, especially if they are subjected to mechanical, thermal or chemical influences.

SUMMARY OF THE INVENTION

It is the object of the invention to provide an antenna arrangement which allows non-contact coupling between the antenna and the electronic chip or chip module.

In the information carrier arrangement according to the invention, the chip or the chip module is coupled inductively and/or capacitatively to the antenna. For this purpose the chip or the chip module is disposed together with the coupling element on a detection plate. The chip or the chip module and the coupling element form an integral unit, the detection plate. The antenna itself is designed as an electric antenna and requires no galvanic connection to the chip or chip module and coupling element.

The combination of the correspondingly matched coupling element and the antenna also results in an increase in the bandwidth of the entire system whereby it is achieved that the information carrier arrangement is compatible for operation at different but neighboring frequencies as a result of different national regulations without design modifications and tuning.

The electric antenna is preferably a dipole, half-wave emitter, full-wave emitter or a groundplane, and the coupling element is arranged at a location of the electric antenna where a minimal standing wave ratio occurs.

The construction of the electric antenna as a dipole, half-wave emitter, full-wave emitter or as a groundplane allows resonant tuning to the working frequency and an antenna gain compared with an isotropic emitter. As a result of the arrangement of the coupling loop at a location of the electric antenna where a minimal standing wave ratio occurs, an optimal matching and range is obtained.

The electric antenna can be mechanically shortened and have a meander-shaped extension inductance. As a result, matching to the working frequency can be achieved even with textile labels, textile goods or tags whose dimensions are smaller than an integer multiple of the quarter wavelength of the working frequency. The meander-shaped extension inductance allows a representation within one plane and without overlapping of the conductors. These can be produced industrially using conventional textile methods such as weaving or embroidering.

The coupling element is preferably arranged as a coupling loop within a meander comprising two parallel conductors and one at right angles thereto. In this case, the coupling loop can be enclosed up to three quarters of its circumference which results in more efficient coupling between the coupling loop and the electric antenna.

The electric antenna can be formed from a continuous electric conductor which is tuned in resonance by separating. The production of the antenna is simplified by processing a continuous conductor, e.g., a textile thread, a wire or a conducting film. By separating the electrical conductor, the antenna is formed at the desired location and at the same time is tuned individually in resonance to the working frequency of the detection plate used.

The detection plate can be affixed to an item to be identified, which can be a product, living being, a label, a tag, a single package, a containerized package or a transport aid. The detection plate can be affixed by a reversibly detachable or irreversibly non-detachable fixing means. In the case of a reversibly detachable detection plate, the detection plate can be removed, e.g., after a production, transport or sales process if the information is subsequently no longer required or is not to be used by unauthorized persons. It is also possible to secure low-value goods using a cost-effective "disposable" electric antenna at least until sale.

In the case of an irreversibly non-detachably connected detection plate, the information should be permanently linked to the product, the living being, the label, the tag, the single package, the containerized package or the transport aid. Tampering is thereby made difficult and impossible without destroying the bond comprising product, label, tag, single package, containerized package or transport aid on the one hand and detection plate on the other hand.

In the case of living beings, the arrangement can consist of a flexible male optical identification flag which also contains the flexible antenna and a pin which can penetrate through an animal's ear, for example, in order to be locked in a female electronic identification tag which contains the detection plate. The identification flag can only be used until the animal is slaughtered, while the identification tag can be re-used.

The fixing means can be embodied as at least one pin attached to the detection plate and penetrating through the product, the living being, the label, the tag, the single package, the containerized package or the transport aid, and a knob for receiving one end of the pin, disposed on the detection plate on the opposite side of the product, the label, the tag, the single package, the containerized package or the transport aid. This design of the fixing means makes it possible to achieve a positive connection and is thus particularly secure.

In the case of the reversibly detachable design, removal is only possible using a special tool to prevent unauthorized removal.

The fixing means can be embodied as welding or bonding or pasting or laminating or gluing or crimping or adhesive film or by means of a patch bond produced under heat and pressure. In this case, the fixing means can be embodied as hot melt adhesive or reaction adhesive.

The detection means is joined to the product, the label, the tag, the single package, the containerized package or the transport aid directly, e.g., by merging fibers or filaments, or indirectly by an adhesive material. The properties of the joined layers comprising the detection plate and the product, the label, the tag, the single package, the containerized package or the transport aid are thus retained.

Furthermore, the fixing means can be embodied as discrete joining points or very fine perforated adhesive film. This restriction to discrete joining points or a very fine, that is thin and flexible, perforated adhesive film avoids any stiffening of the bonded layers of the detection plate and the product, the label, the tag, the single package, the containerized package or the transport aid.

The fixing means can also be formed from weaving yarns which are laid in the area of the detection plate above the detection plate and are woven outside the detection plate with a fabric of the product, the label, the tag, the single package, the containerized package or the transport aid.

It is hereby possible to integrally fix the detection plate within a fabric of the product, label, tag, the single package, the containerized packaged or the transport aid. In this case, the join can be made within an industrial weaving process. The fixing means can also be embodied as a hook and pile-type closure, such as Velcro™ fasteners.

It is hereby possible to rapidly fix and release the detection plate. The detection plate can be sealed with a coating. This coating can effectively protect the detection plate from mechanical and chemical influences.

The detection plate can have a coupling loop which comprises shortenable coupler structures and can be adapted to the width of the product, label, tag, the single package, the containerized package or the transport aid by cutting while retaining a closed coupling loop. This design makes it possible to have a standard configuration and therefore economical production of detection plates for different widths of products, labels, tags, single packages, containerized packages or transport aids. Since a closed coupling loop is still retained when cutting to the smaller width of the detection plate, close coupling of the coupling loop to an antenna is always ensured.

The detection plate and/or the textile label, the textile goods or the tag can comprise a multi-part antenna and/or coupling loop which only produce frequency or impedance matching jointly and under mutual addition. This configuration makes tampering difficult by falsification or simple exchange of products, labels, tags, single packages, containerized packages or transport aids and detection plates since the entire system requires a plurality of components which must be tuned to one another.

In a practical embodiment, the components of the multi-part antenna and/or coupling loop are attached to different carriers which are uniquely locally allocated among one another to ensure the function. In this case, the local arrangement of the components of the multi-part antenna and/or coupling loop requires particular specialized knowledge to ensure the interaction of all the components. Tampering is thereby made difficult.

At least part element of the multi-part antenna and/or of the coupling element is arranged concealed in the detection plate and/or in the product, label, tag, the single package, the containerized package or the transport aid. Since the structure of the antenna or the coupling elements cannot be identified from outside, only a person with specialized knowledge can reconstruct this when individual components are removed, and thus tampering is made more difficult.

According to a further development, at least two detection plates can be provided which can be interrogated jointly. This further development likewise or additionally provides improved protection from tampering since functioning of the entire system is only ensured when information from at least two detection plates can be interrogated.

The detection plates can comprise mutually complementary information and can be evaluated as valid or invalid by joint interrogation. Examples of this are items of clothing which belong together such as socks, gloves, shoes, jackets and trousers which contain individual detection plates with information such as right, left, color, and size, but are packed as a unit in pairs and are provided with an antenna which also serves as an amplifier. Furthermore, a specific number of products belonging to a package or contents of a container consisting of a plurality of individual parts can also be examples.

It is thereby achieved that an interrogation is only evaluated as valid if there exists a valid pairing or grouping. Tampering, confusions or missing parts can therefore be exposed. The amplifier antenna or plurality of amplifier antennae can also be arranged in a common package, containerized package or transport aid. Depending on the items with detection plates arranged in the package, containerized package or transport aid, one electric antenna or different electric antennae can be used for a plurality of detection plates or a plurality of electric antennae can be used by coupling for one detection plate.

Furthermore, the detection plates can exchange complementary information among one another with the aid of a reader and can be evaluated as valid or invalid by individual or joint interrogation. A security element of the authentication can hereby be moved into the detection plate and the information to be transmitted about a valid or invalid interrogation can be simplified or made more secure.

The product can be embodied as textile goods, an item of clothing or safety belt and the electric antenna can be connected to the product, integrated in the product or a component of the product. Examples of textile goods are rental laundry and cleaning textiles. The label can be embodied as a textile label and the electric antenna can be connected to the label, integrated in the label or a component of the label. The antenna can be connected to the tag, the single package, the containerized package or the transport aid, it can be integrated in the tag, the single package, the containerized package or the transport aid, or it can be a component of the tag, the single package, the containerized package or the transport aid.

The detection plate is preferably embodied separately from the electric antenna or the carrier of the electric antenna. As a result, the detection plate and the antenna or the carrier of the antenna can be manufactured separately, assembled and only subsequently optimally connected and coupled.

Instead of an electric antenna, the reader can also have a magnetic antenna or an antenna with a magnetic component. This antenna can also be coupled to the coupling element of the detection plate embodied as a coupling loop for reading purposes.

The invention also relates to washable textile goods. In this regard, it is also the object of the invention to make identification possible both in the dry state and in the wet state. By restricting the range, the information of the electronic chip or chip module on the detection plate can also be read in wet textile goods. When the coupling element is embodied as a coupling loop, the coupling is made inductively as an H-field antenna and is less dependent on electrical and capacitive influences like an electric antenna. Such influences can extremely detune the electric antenna when wet, for example, and thus make it unusable as a passive amplifier antenna.

The invention further relates to an identification made for living beings. In this respect, it is the object of the invention to make identification possible both when the male optical identification flag is intact and when it is damaged or lost.

Likewise by restricting the range, the information of the electronic chip or chip module on the detection plate can also be read if the identification flag is damaged or missing. If the coupling element is embodied as a coupling loop in the female electronic identification tag, the coupling is made inductively as an H-field antenna and is less dependent on electrical and capacitive influences like an electric antenna.

Numerous other objects and features of the present invention will be apparent to those skilled in this art from the following description wherein there is shown and described exemplary embodiments of the present invention, simply by way of illustration of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 4a is a detection plate with fixing means embodied as adhesive and a globtop coating;

FIG. 4b is a detection plate which can be pressed directly into the adhesive pointing towards the textile surface;

FIG. 5 is the detection plate from FIG. 4b affixed to a textile label;

FIG. 6 is the detection plate from FIG. 4a affixed to a textile ribbon;

DETAILED DESCRIPTION OF THE INVENTION

An information carrier arrangement and its applications according to the present invention will now be described with reference to FIGS. 1 to 16 of the accompanying drawings.

Figure 1:
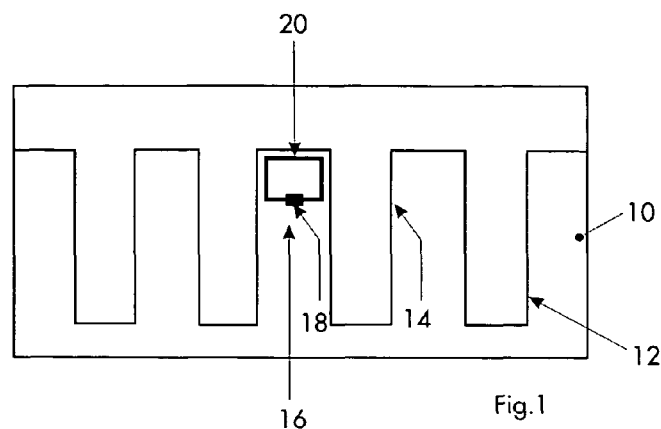
FIG. 1 is a textile label with an electric antenna as a mechanically shortened dipole and a detection plate.

FIG. 1 shows a textile label 10 with an electric antenna 12. The antenna is designed as a mechanically shortened dipole with a meandering inductance 14. The terms "meander" or "meandering" herein refer to the back and forth pattern made by the inductance 14 on the label 10. Located inside the meander 14 at the center of the antenna 12 is a detection plate 16 comprising an electronic chip or chip module 18 ("electronic chip" in this application shall be understood to include both electronic chips and chip modules) and a coupling loop 20 connected to the electronic chip 18. The coupling loop 20 is located at a location of low impedance of the electric antenna 12. An inductive coupling with simultaneous impedance matching between the coupling loop 20 and the electric antenna 12 is achieved as a result of the arrangement inside a meander 14 comprising two parallel conductors and another conductor at right angles thereto.

Figure 2:
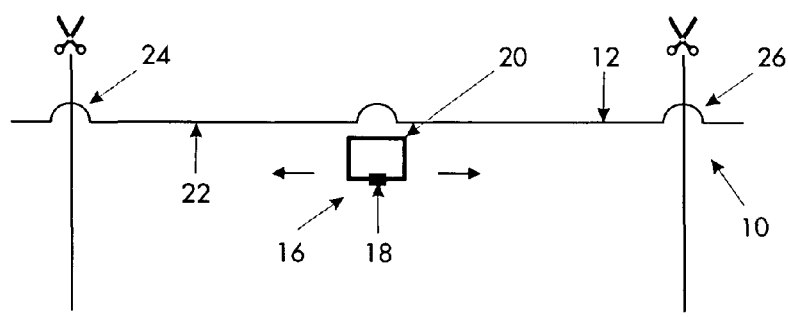
FIG. 2 is a textile label with an electric antenna formed from a continuous electrical conductor which is brought into resonance by separating, and a detection plate.

FIG. 2 shows another textile label 10 with an electric antenna 12. The antenna 12 is formed from an originally continuous electrical conductor 22 which is separated at two locations 24, 26 and thus forms a dipole. The conductor 22 is separated at locations having a distance of half a wavelength of the working frequency. As a result, the dipole antenna formed is simultaneously in resonance with the working frequency. Located adjacent to the antenna 12 is a detection plate 16 comprising an electronic chip 18 and a coupling loop 20 connected to the electronic chip 18. The coupling loop 20 is located at a location of low impedance of the electric antenna 12, preferably in the center or offset by more than one eighth of the wavelength with respect to the center. An inductive coupling with simultaneous impedance matching between the coupling loop 20 and the electric antenna 12 is also achieved by this means.

In general, the coupling loop can be positioned in the magnetic field produced by the antenna with large tolerances in the central area but in this case, a mismatch of the impedance can result in a smaller range.

Figure 3A:
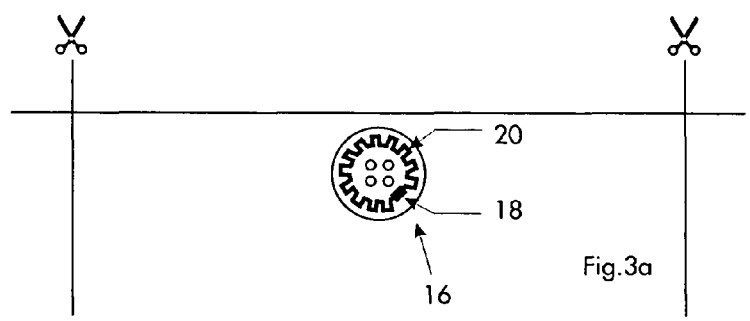
FIG. 3a is a plan view of a button-like detection plate affixed to a textile label.

FIG. 3a shows a button-like detection plate 16 affixed to a textile label in plan view, which incorporates the information carrier arrangement from FIG. 1 and FIG. 2.

Figure 3B:
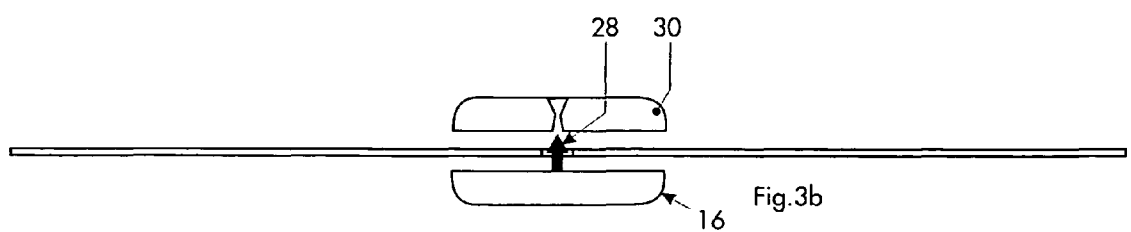
FIG. 3b is a section through a button-like detection plate affixed to a textile label with a pin which penetrates through the textile label and a counter-button.

FIG. 3b is a section through a button-like detection plate 16 with a pin 28 that penetrates through the textile label 28 and a counter-button 30. Since this detection plate 16 is positively connected to the textile label 10, it can be designed as very small. It is thereby inconspicuous and barely impairs the wearing comfort. In addition, it offers little working surface when cleaning and is therefore particularly durable. The connection can be made by pressing together the button components 16, 30. Depending on the design of the connection, the connection can be released non-destructively, optionally by using a special tool, or in the case of a snap-on connection, it can only be released while destroying it at the same time.

FIG. 4a shows a detection plate 16 with fixing means embodied as adhesive 32 and a coating 34. The detection plate 16 comprises a soft flexible film 36 which adapts flexibly to a textile label, textile goods or to a tag. The adhesive 32 can be a hot setting or reaction adhesive which bonds to the threads of the textile label, the textile goods or the tag. A coating 34 with globtop material offers protection from mechanical, thermal and chemical influences. Another coating can also form an adhesive surface at the same time if the detection plate comprising the chip pointing in the direction of the textile label, the textile goods, or the tag is bonded thereto.

Alternatively, as shown in FIG. 4b, an adhesive 38 can also be applied to the textile label 10 itself and then the detection plate 16 with the chip 18 is pressed in the direction of the textile label 10 into the adhesive 38.

FIG. 5 shows the detection plate 16 from FIG. 4b affixed to a textile label 10. In this case, the detection plate 16 is stuck onto the back of the textile label 10 which is not visible.

FIG. 6 shows the detection plate 16 from FIG. 4a as affixed to a textile ribbon 40 at uniform distances in an assembly process. The textile ribbon 40 runs from a supply roll 42 to a finished roll 44. In a first station 46 a detection plate 16 wetted with a reaction adhesive 32 is applied to the textile ribbon 40, in a second station 48 a silicon coating is applied, and in a third station 52 the reaction adhesive 32 and/or the silicon coating 50 is activated by UV light. When using a structure as shown in FIG. 4b, the detection plate 16 together with the chip 18 can be pressed in the direction of the textile label 10 into a drop of adhesive 38.

Figure 7:
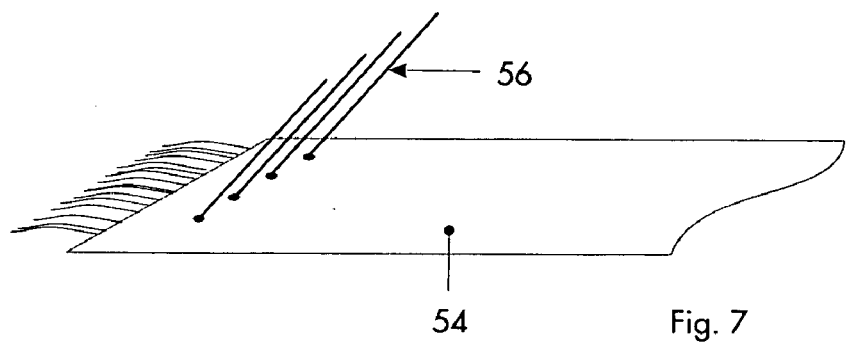
FIG. 7 is a fabric for receiving a detection plate.

FIG. 7 shows a fabric 54 for receiving a detection plate 16. The fabric 54 is produced on a weaving machine which comprises an additional compartment for independently controlling a portion of the warp threads 56. In this way, it is possible to alternately weave all the warp threads on one occasion and only a portion of the warp threads on another occasion and guide the other warp threads 56 further on the fabric 54. A receiving chamber for detection plates is thus formed, which is delimited on a flat side by a woven area of warp and weft threads and on the other flat side by unwoven warp threads 56. At the side, the chamber is then again delimited by the completely woven warp and weft threads. At the same time, an electrically conducting weft thread can be guided in a meander shape and form an extension inductance.

Figure 8A:
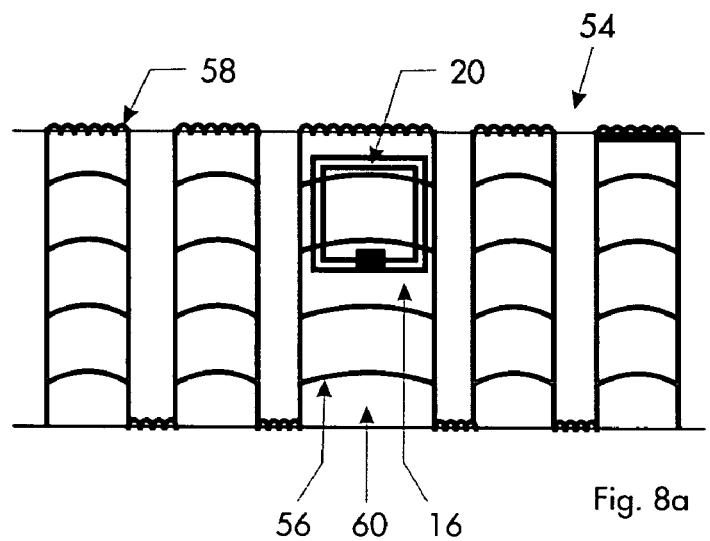
FIG. 8a is a detection plate integrated into a fabric ribbon with a narrower width than that of the fabric ribbon.
Figure 8B:
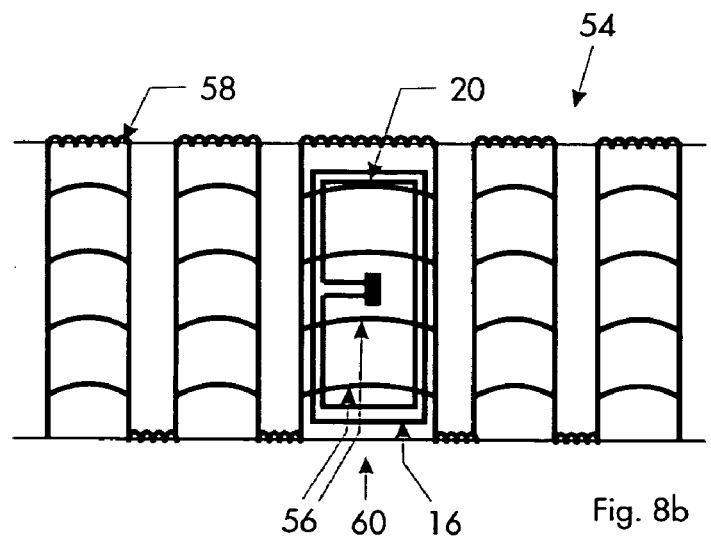
FIG. 8b is a detection plate integrated into a fabric ribbon having the same width as that of the fabric ribbon.

FIGS. 8a and 8b show fabric ribbons 54 fabricated as in FIG. 7 with warp threads 56 and an electrically conducting weft thread 58 guided in a meander shape and chambers 60 for receiving a detection plate 16. In FIG. 8a the detection plate 16 only extends over a portion of the width of the textile ribbon 54. With the coupling loop 20 arranged on the detection plate 16, a close coupling with a meander of the antenna 58 can be achieved regardless of the width of the textile ribbon 54, but this variant would result in a tilted position of the reel when rolling the textile ribbon 54 onto a roll.

In FIG. 8b the detection plate 16 extends over the entire width of the textile ribbon 54. A tilted position of the reel is thus avoided when winding the textile ribbon onto a roll.

Figure 9:
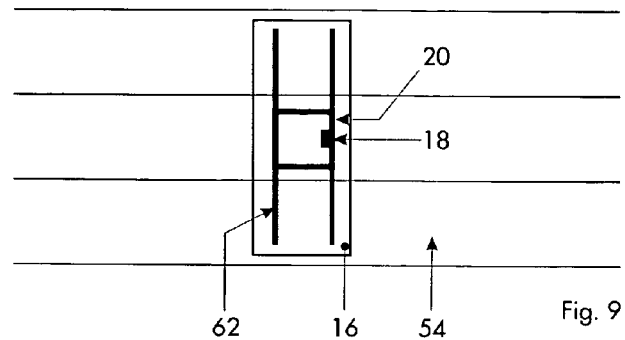
FIG. 9 is a detection plate with a coupling loop comprising a shortenable structure.

In order to be able to use uniformly produced detection plates 16 for textile ribbons 54 of different width, FIG. 9 shows a variant with a coupling loop 20 which comprises a shortenable coupling structure 62. If the textile ribbon 54 is shorter than the original detection plate 16, the detection plate 16 can be adapted to the width of the textile ribbon 54 by cutting while retaining a closed coupling loop 20.

Figure 10:
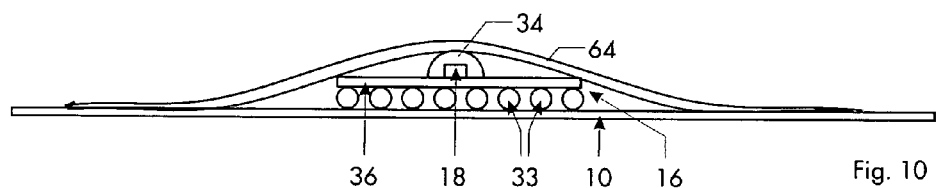
FIG. 10 is a detection plate affixed to a textile label using a patch.

FIG. 10 shows a detection plate 16 affixed to a textile label 10 using a patch 64. The patch 64 has a coating with a hot melt adhesive. The patch 64 placed over the detection plate 16 is affixed to the textile label 10 by pressure and heat. The detection plate 16 is thereby included and thus fixed to the textile label 10 at the same time and covered by the patch 64.

Figure 11:
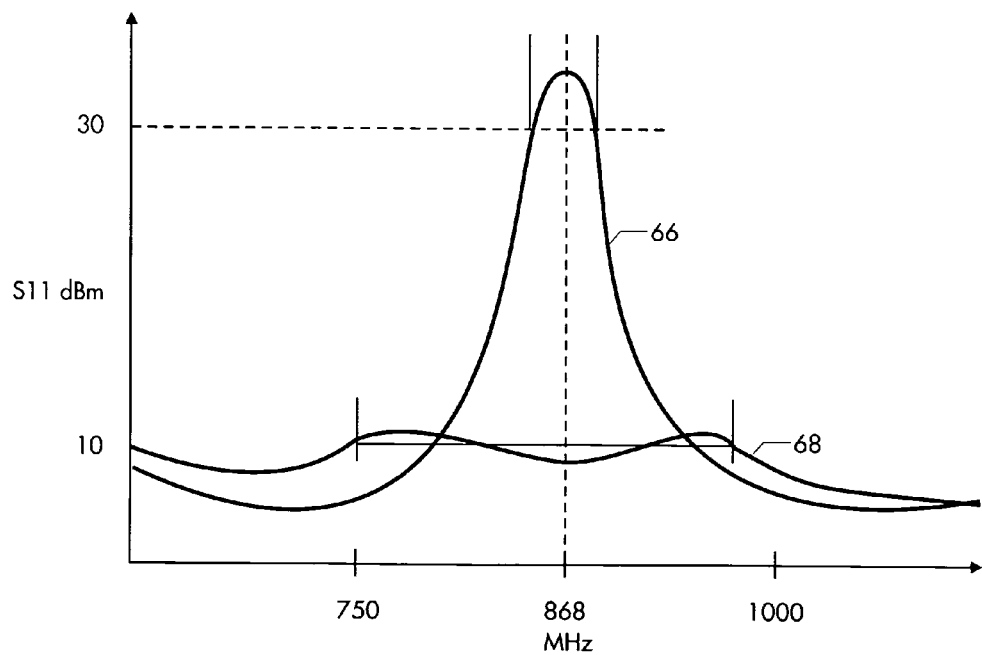
FIG. 11 is a diagram of the bandwidth of an electric antenna and the entire system.

FIG. 11 is a diagram of the bandwidth of an electric antenna as a curve 66 and of the entire system as curve 68. Shown here as an example is the curve 66 of the bandwidth of an antenna whose resonance frequency corresponds to a first permitted working frequency of 868 MHz. The diagram shows that at a second permitted working frequency of 915 MHz, the antenna would already be located outside its optimum. In conjunction with the coupling element, however, a broadband characteristic of the entire system is obtained, as indicated by the bandwidth curve 68, so that no matching to different national standards is required.

Figure 12:
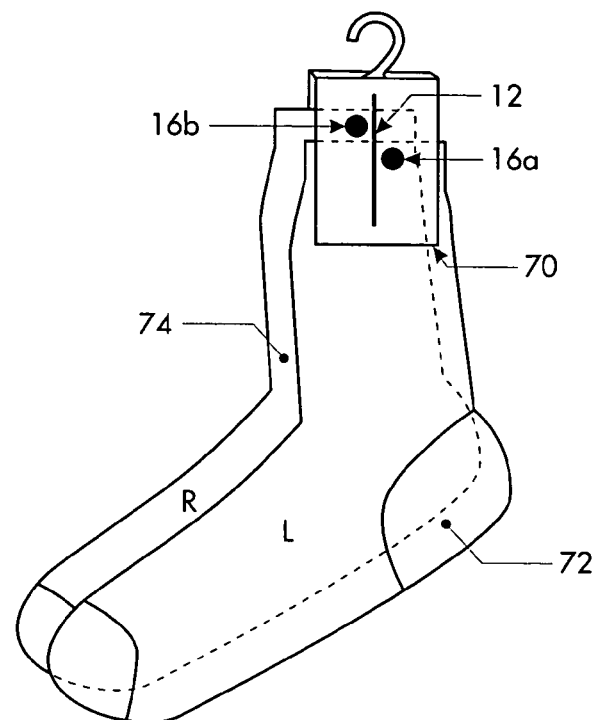
FIG. 12 is a packaging unit for relevant textile goods.

FIG. 12 shows a packaging unit 70 for relevant textile goods, here a pair of socks 72, 74. Each sock has its own detection plate 16a, 16b which comprises additional information on size as well as right and left. The two detection plates 16a, 16b are coupled to a common electric antenna 12 as an amplifier antenna and are evaluated by a joint interrogation. The antenna 12 is located in the packaging unit 70 in this case.

Figure 13:
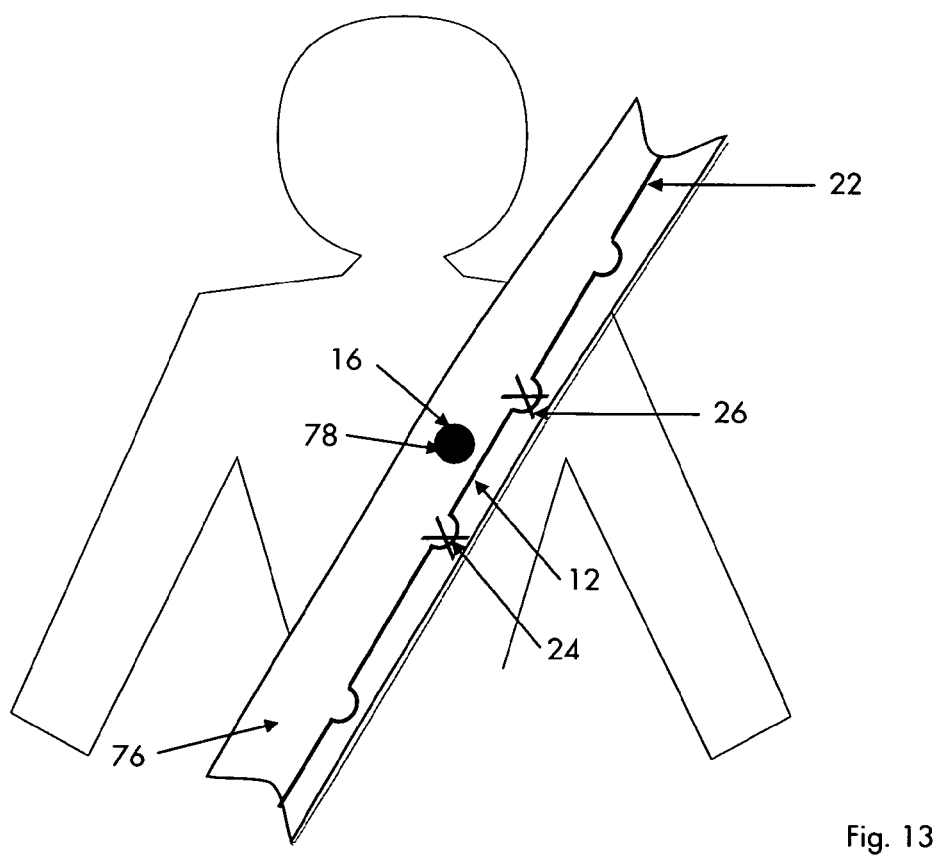
FIG. 13 is a detection plate affixed to a safety belt with integrated antenna.

FIG. 13 shows a detection plate 16 affixed to a safety belt 76 with built-in antenna 12. The antenna 12 is formed from an originally continuous electrical conductor 22 which extends along the safety belt 76 as in FIG. 2, and is separated at two locations 24, 26, thus forming a dipole. The conductor 22 is separated at locations at a distance of half a wavelength of the working frequency and which lie in the area of a stop button 78 which fixes the closure buckle in a rest position. In this case, the stop button 78 is constructed as in FIGS. 3a and 3b and comprises the detection plate 16.

Figure 14:
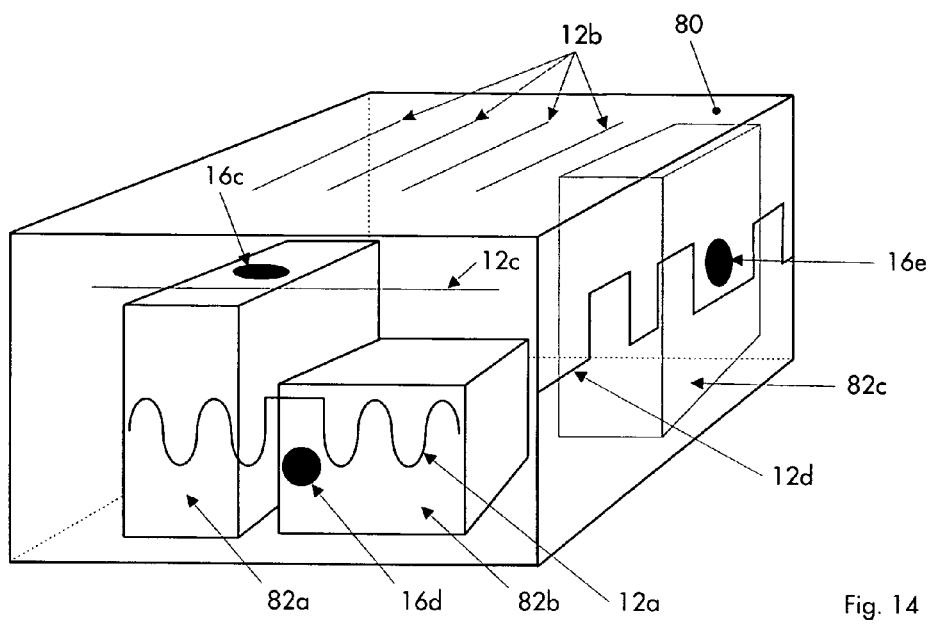
FIG. 14 is a containerized package with a plurality of integrated antennae and detection plates affixed to each of the packaged products.

FIG. 14 shows a containerized package 80 comprising a plurality of integrated electric antennae 12a, 12b, 12c, 12d and detection plates 16c, 16d, 16e affixed to the packaged products 82a, 82b, 82c. The plurality of detection plates on or at the products 82a, 82b, 82c are coupled to a common electric antenna or different electric antennae 12a, 12b, 12c, 12d which act as passive amplifier antennae. The coupling is effected spontaneously depending on the position of the products 82a, 82b, 82c in the containerized package 80.

Figure 15:
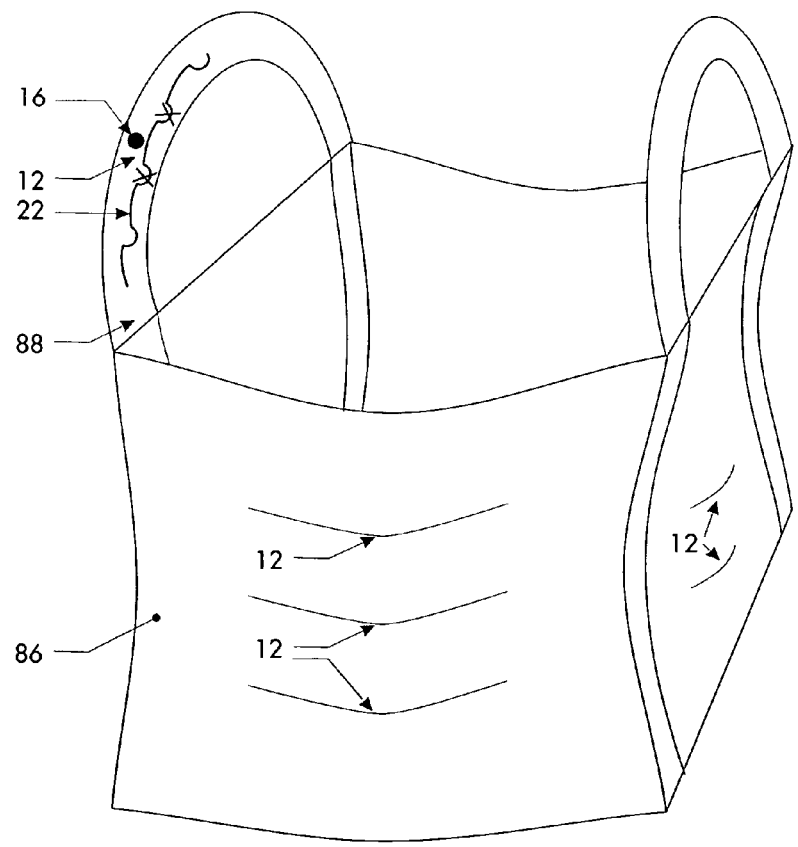
FIG. 15 is a transport bag with integrated antenna and detection plate.

FIG. 15 shows a transport bag 86 with built-in antenna 12. The antenna 12 is located here in one of the carrying loops 88. A detection plate 16 of the transport bag 86 can be allocated to the antenna 12 as shown. In addition, it is possible for products located in the transport bag 86 to be fitted with their own detection plates and a plurality of antennae 12 in the transport bag 86 can act as separate or common passive amplifier antennae.

Figure 16:
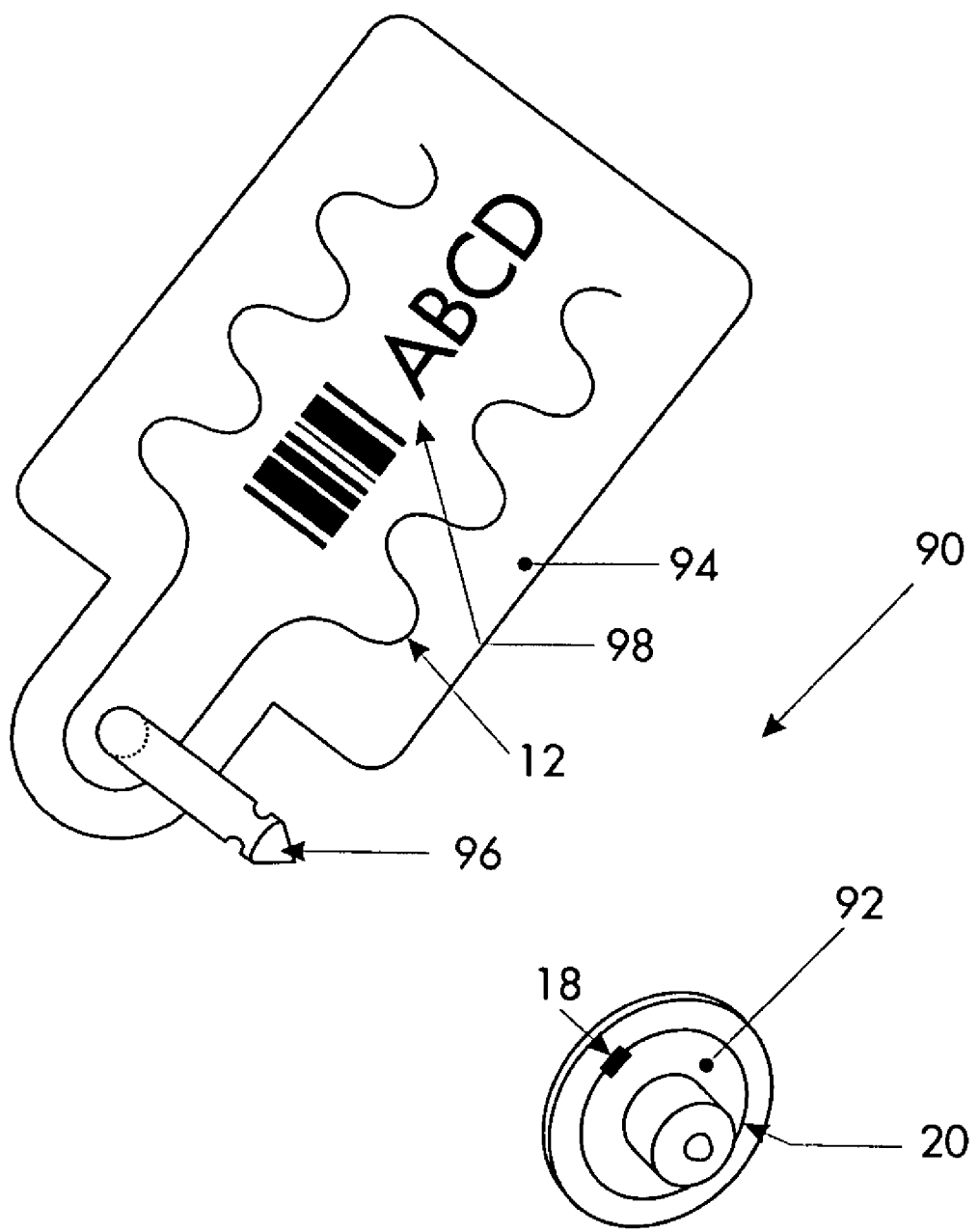
FIG. 16 is an electronic ear tag for a living being.

FIG. 16 shows an electronic ear tag 90 for a living being. The electronic ear tag consists of a button-like detection plate 92 comprising a chip 18 and a coupling element 20 and is connected to an identification flag 94 by means of a pin 96 which penetrates through the ear of the living being. The pin 96 is preferably part of the identification flag 94. In addition to an optically readable identifier 98, the identification flag 94 comprises an electric antenna 12 coupled to the coupling element 20. In the case of cattle or pigs, for example, the optically readable identifier 98 can contain officially prescribed information and can be linked by means of a concordance database to information stored in the chip 18. At the same time, the identification flag 94 also bears the conducting structure of the electric antenna 12.

If the identification flag is lost or damaged, a duplicate can be connected to a button-like detection plate. When the identification flag is replaced by a new identification to be registered, this must be re-linked to information stored in the chip or chip module. The detection plate can then be re-used. Likewise, the detection plate can be re-used after slaughtering but the identification flag can only be used once on an animal and must then be disposed of.

While the invention has been specifically described in connection with specific embodiments thereof, it is to be understood that this is by way of illustration and not of limitation, and the scope of the appended claims should be construed as broadly as the prior art will permit.

What is claimed is:

1. An information carrier arrangement, comprising:
at least one detection plate comprising an electronic chip and a coupling element disposed on an item to be identified; and
at least one electric antenna connected or coupled to the at least one detection plate;
wherein the coupling element on the detection plate is connected to the electronic chip, and said coupling element is coupled to the electric antenna by at least one of an inductive coupling and a capacitative coupling;
wherein the item to be identified is selected from the group consisting of textile goods, textile labels, an item of clothing, and a safety belt, and the electric antenna is connected to the item, integrated in the item, or a component of the item;
wherein the detection plate is embodied separately from the electric antenna or a carrier of the electric antenna; and
further comprising a fixing means for affixing the detection plate to the item to be identified without stiffening the item, said fixing means comprising discrete joining points or very fine perforated adhesive film to avoid stiffening the item.

2. The information carrier arrangement according to claim 1, wherein the electric antenna is a structure selected from the group consisting of a dipole, a half-wave emitter, a full-wave emitter, and a groundplane, and the coupling element is arranged at a location of the electric antenna where at least one of a minimal standing wave ratio, an optimal band width of the entire system, and an optimal antenna gain occurs.

3. The information carrier arrangement according to claim 1, wherein the electric antenna is mechanically shortened and has an inductance with a meandering pattern.

4. The information carrier arrangement according to claim 3, wherein the coupling element provides an inductive coupling with simultaeous impedence matching with the electric antenna.

5. The information carrier arrangement according to claim 3, wherein the coupling element is embodied as a coupling loop and is arranged within a meander of two parallel conductors and another conductor at right angles thereto.

6. The information carrier arrangement according to claim 1, wherein the electric antenna is formed by a continuous electric conductor which is separated at two locations to form a dipole which is in resonance with a working frequency.

7. The information carrier arrangement according claim 1, wherein the fixing means is a reversibly detachable or irreversibly non-detachable fixing means.

8. The information carrier arrangement according to claim 7, wherein the fixing means is embodied as at least one pin attached to the detection plate that penetrates through the item to be identified, and a knob for receiving one end of the pin disposed on the detection plate on the opposite side of the item to be identified.

9. The information carrier arrangement according to claim 7, wherein the fixing means comprises at least one of welding, bonding, pasting, laminating, gluing, crimping, adhesive film attachment, and a patch bond produced under heat and pressure.

10. The information carrier arrangement according to claim 7, wherein the fixing means is embodied as hot melt adhesive or reaction adhesive.

11. The information carrier arrangement according to claim 1, wherein the fixing means is embodied as discrete joining points.

12. The information carrier arrangement according to claim 7, wherein the fixing means is embodied as weaving yarns which are laid in the area of the detection plate above the detection plate and are woven outside the detection plate with a fabric of the item to be identified.

13. The information carrier arrangement according to claim 7, wherein the fixing means is embodied as a hook and pile-type closure.

14. The information carrier arrangement according to claim 1, wherein the detection plate is sealed with a coating.

15. The information carrier arrangement according to claim 14, wherein the coating forms an adhesive surface.

16. The information carrier arrangement according to claim 1, wherein the detection plate comprises a coupling loop which comprises a shortenable coupler structure and can be adapted to the width of the item to be identified by cutting while retaining a closed coupling loop.

17. The information carrier arrangement according to claim 1, wherein at least one of the detection plate and the item to be identified comprises at least one of a multi-part antenna and coupling elements that only produce frequency or impedance matching jointly or under mutual addition.

18. The information carrier arrangement according to claim 17, wherein the components of at least one of the multi-part antenna and coupling elements are attached to different carriers that are uniquely locally allocated among one another to ensure proper functioning.

19. The information carrier arrangement according to claim 17, wherein at least part of the elements of at least one of the multi-part antenna and the coupling element are concealed in at least one of the detection plate and in or on the item to be identified.

20. The information carrier arrangement according to claim 1, wherein at least two detection plates are provided that can be interrogated jointly.

21. The information carrier arrangement according to claim 20, wherein at least two spatially separated detection plates are allocated to a common electric antenna.

22. The information carrier arrangement according to claim 20, wherein at least two spatially separated detection plates are allocated to a plurality of electric antennae.

23. The information carrier arrangement according to claim 22, wherein the electric antennae have different designs.

24. The information carrier arrangement according to claim 20, wherein one detection plate is allocated to a plurality of electric antennae.

25. The information carrier arrangement according to claim 20, wherein the detection plates comprise mutually complementary information and can be evaluated as valid or invalid by joint interrogation.

26. The information carrier arrangement according to claim 20, wherein the detection plates exchange complementary information among one another with the aid of a reader and can be evaluated as valid or invalid by individual or joint interrogation.

27. The information carrier arrangement according to claim 1, wherein the item to be identified is selected from the group consisting of textile goods, an item of clothing, and a safety belt.

28. The information carrier arrangement according to claim 1, wherein the item to be identified is embodied as a textile label.

29. The information carrier arrangement according to claim 1, wherein the coupling element is constructed as a coupling loop that forms an additional magnetic antenna to the existing electric antenna.

30. The information carrier arrangement according to claim 29, wherein the coupling loop can be read by a magnetic antenna or multi-antenna of the reader, which is configured as both magnetic and electric.

31. The information carrier arrangement according to claim 2, wherein the coupling element provides an inductive coupling with simultaeous impedence matching with the electric antenna.

32. The information carrier arrangement according to claim 1, wherein the coupling element provides an inductive coupling with simultaeous impedence matching with the electric antenna.

33. The information carrier arrangement according to claim 1, wherein the electric antenna and the fixing means for the detection plate are constructed in a single industrial process.

34. The information carrier arrangement according to claim 33, wherein the item to be identified is embodied as a textile label, and the electric antenna is produced industrially using conventional textile methods such as weaving or embroidery.

35. The information carrier arrangement according to claim 1, wherein the item to be identified is embodied as a textile label, and the electric antenna is produced industrially using conventional textile methods such as weaving or embroidery.

36. The information carrier arrangement according to claim 28, wherein the electric antenna is produced industrially using conventional textile methods such as weaving or embroidery.

\* \* \* \* \*